(12) United States Patent
Okada et al.

(10) Patent No.: US 7,021,343 B2
(45) Date of Patent: Apr. 4, 2006

(54) FUEL FILLER PIPE FOR AUTOMOBILE

(75) Inventors: Jun Okada, Miyoshi (JP); Kenji Kamiya, Chiryu (JP); Takahiro Koyama, Nagoya (JP); Masahito Sasaki, Nagoya (JP)

(73) Assignees: Horie Metal Co., Ltd., Aichi (JP); Sumitomo Light Metal Industries, Ltd., Tokyo (JP)

( * ) Notice: Subject to any disclaimer, the term of this patent is extended or adjusted under 35 U.S.C. 154(b) by 0 days.

(21) Appl. No.: 11/104,973

(22) Filed: Apr. 13, 2005

(65) Prior Publication Data

US 2005/0224135 A1 Oct. 13, 2005

(30) Foreign Application Priority Data

Apr. 13, 2004 (JP) .............................. 2004-117741

(51) Int. Cl.
*B65B 1/04* (2006.01)

(52) U.S. Cl. ..................................... 141/286; 220/86.2

(58) Field of Classification Search ................ 141/286, 141/349, 350; 220/86.2; 138/143, 145, 138/146
See application file for complete search history.

(56) References Cited

U.S. PATENT DOCUMENTS

| 3,979,010 A | * | 9/1976 | Fiedler et al. | ............. 220/86.2 |
| 5,385,179 A | * | 1/1995 | Bates et al. | ................. 141/312 |
| 6,659,137 B1 | * | 12/2003 | Imasaki et al. | ............. 138/142 |

\* cited by examiner

*Primary Examiner*—Steven O. Douglas
(74) *Attorney, Agent, or Firm*—Koda & Androlia

(57) ABSTRACT

A fuel filler pipe interconnecting a fuel tank and canister, and a fuel supply port of an automobile includes a fuel filler pipe body having an upper end and a circulation tube and an air vent tube each of which has an end communicating with the upper end of the fuel filler pipe body. Each of the filler pipe body, circulation tube and air vent tube includes a clad tube made of an aluminum and having a double-layer structure including a core made of an aluminum alloy and a outer cladding layer made of an aluminum alloy and having an effect of sacrificial anode for the core.

5 Claims, 7 Drawing Sheets

FUEL FILLER PIPE FOR AUTOMOBILE

BACKGROUND OF THE INVENTION

1. Field of the Invention

This invention relates to a fuel filler pipe for automobile using an aluminum clad tube.

2. Description of the Related Art

Conventional fuel filler pipes used in automobiles are made of a metal or synthetic resin. Metal fuel filler pipes include those made of stainless steel, aluminum and steel. The stainless steel fuel filler pipes are widely used and include those to which corrosion prevention such as painting is applied and those to which no such corrosion prevention is applied. The aluminum fuel filler pipes are employed in some types of commercial automobiles since they contribute to reduction in the weight of automobile components. Aluminum with a single structure or pure aluminum is used for the aluminum fuel filler pipes and which no corrosion prevention.

Various types of synthetic resin fuel filler pipes have been proposed since they are suitable for the weight reduction. For example, JP-A-H08-91063 discloses a fuel filler pipe comprising a pipe body made of high-density polyethylene as a principal material by the blowing. An electroplated layer is provided on an outer face of the pipe body for limiting permeation of fuel such as gasoline or the like. Thus, the aforementioned publication discloses a technique for improving a function of preventing gas permeation. JP-Y-H03-30178 discloses a fuel filler pipe made of a resin.

The metal fuel filler pipes are superior to the synthetic resin fuel filler pipes in the gas barrier properties but have a larger weight and are easier to rust as compared with the synthetic resin fuel filler pipe. An aluminum fuel filler pipe has been desired which has a light weight and has a high rust-preventing performance.

SUMMARY OF THE INVENTION

Therefore, an object of the present invention is to provide a fuel filler pipe which can reduce the weight thereof and improve the rust-preventing performance by the use of an aluminum clad tube.

The present invention provides a fuel filler pipe for an automobile, which is provided between a fuel tank and canister, and a fuel supply port. The fuel filler pipe comprises a fuel filler pipe body having an upper end and a circulation tube or a breather tube and an air vent tube each of which has an end communicating with the upper end of the fuel filler pipe body. In the fuel filler pipe, each of the filler pipe body, circulation pipe and air vent tube comprises a clad tube made of aluminum and having a double-layer structure including a core made of an aluminum alloy and a outer cladding layer made of an aluminum alloy and having an effect of sacrificial anode for the core.

Since the above-described fuel filler pipe comprises the clad tube made of aluminum, it can reduce the weight thereof as compared with the conventional fuel filler pipes made of steel or stainless steel. Furthermore, the above-described fuel filler pipe can be manufactured at lower costs particularly than the conventional fuel pipe made of stainless steel. Additionally, a high corrosion-preventing performance can be achieved since occurrence of pitting corrosion in the core is suppressed by the outer cladding layer.

The outer cladding layer has a cladding ratio ranging from 5% to 15%. The cladding ratio is a ratio of outer cladding layer thickness to the entire thickness of the clad tube. Consequently, a remarkable corrosion preventing performance can be achieved.

A mounting support made of aluminum is used to fix the fuel filler pipe body. Consequently, electric erosion can be prevented between the filler pipe body and the mounting support.

BRIEF DESCRIPTION OF THE DRAWINGS

Other objects, features and advantages of the present invention will become clear upon reviewing the following description of the embodiment with reference to the accompanying drawings, in which.

DETAILED DESCRIPTION OF THE INVENTION

A first embodiment of the present invention will be described with reference to FIGS. 1 to 5. The fuel filler pipe for use in automobile (hereinafter "filler pipe") is provided between a fuel tank and a fuel supply port of the automobile body.

Figure 1:
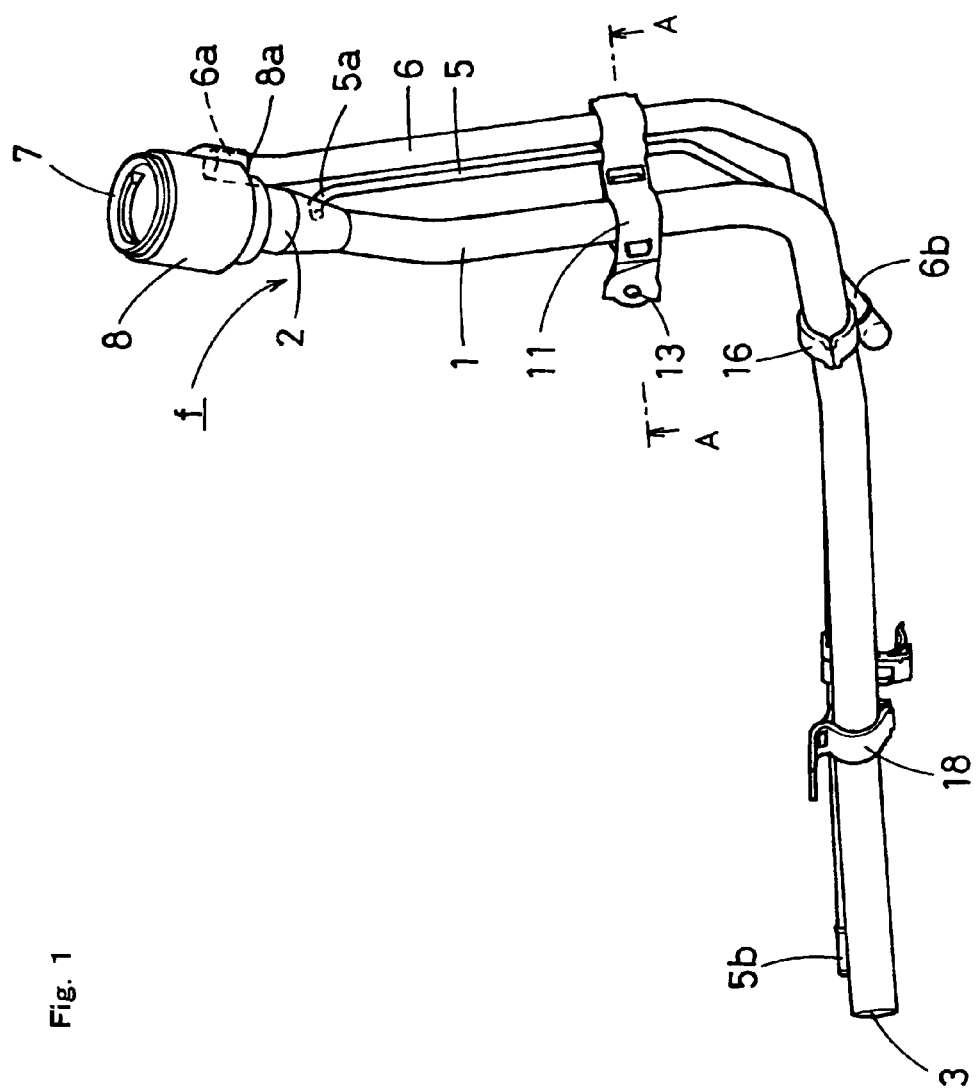
FIG. 1 is a side view of the fuel filler pipe of a first embodiment in accordance with the present invention.
Figure 2:
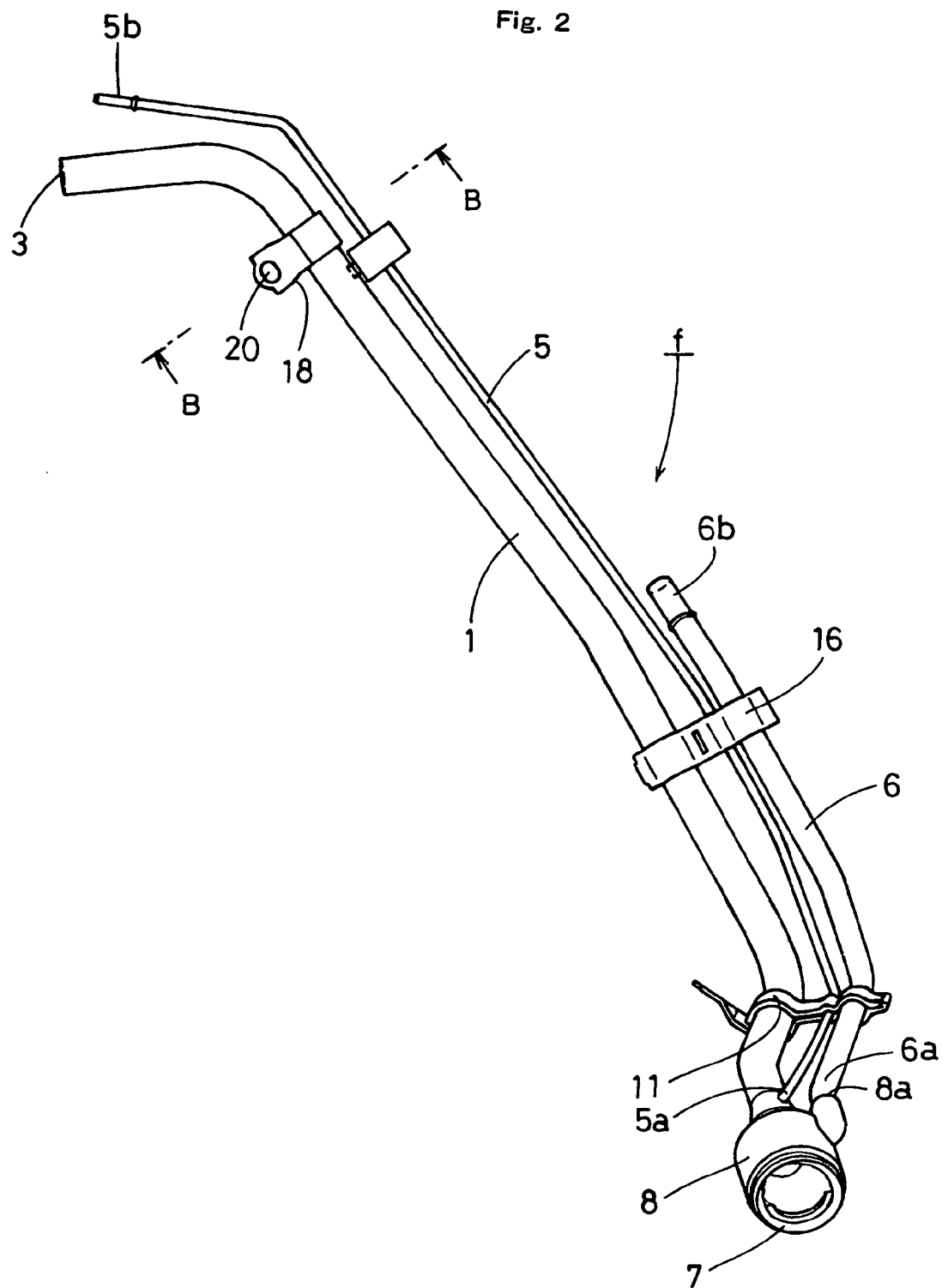
FIG. 2 is a plan view of the fuel filler pipe.
Figure 5:
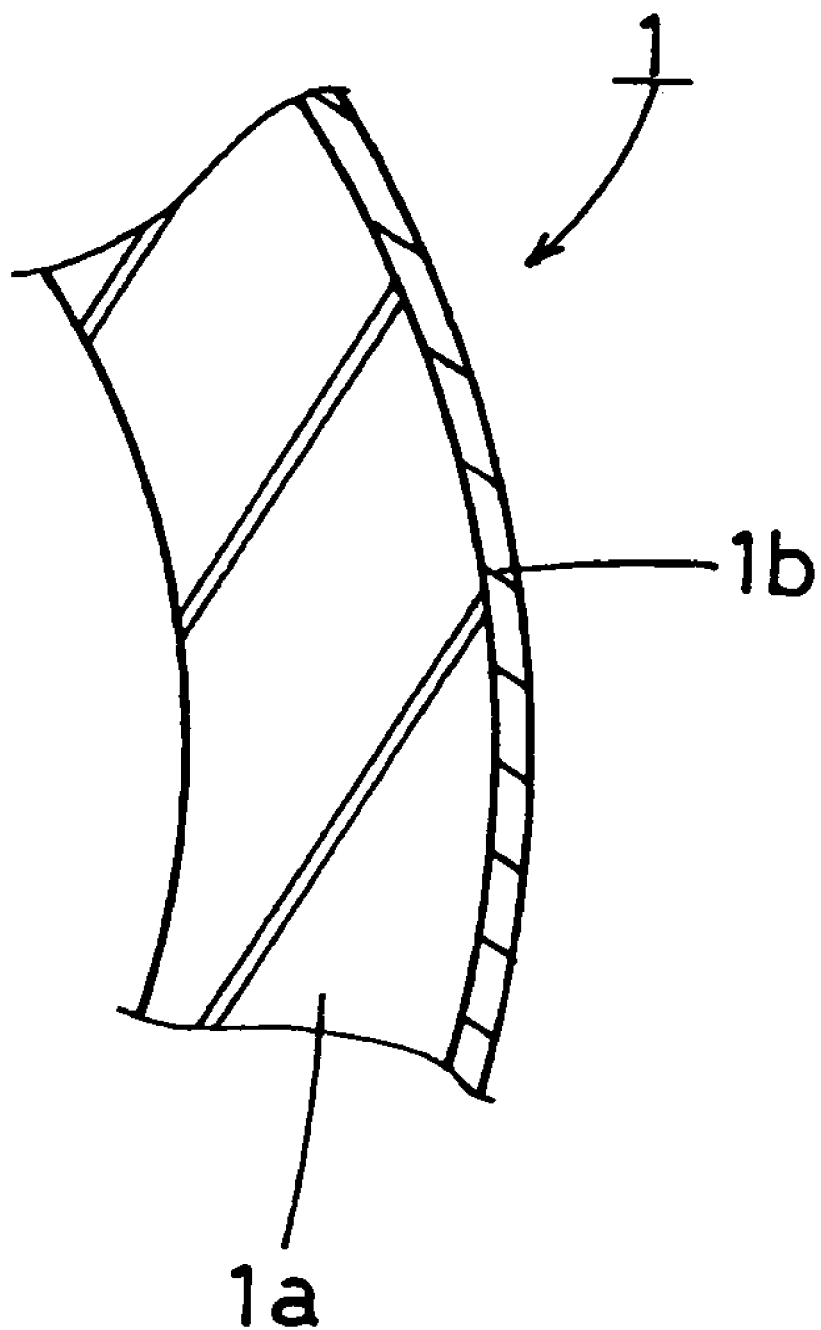
FIG. 5 is a sectional view of a part of the filler pipe body.

Referring to FIG. 1, the filler pipe f includes a filler pipe body 1 formed into a cylindrical shape and has a substantially uniform diameter except for a larger-diameter portion 2 of an upper end thereof located at the fuel supply port side. A retainer 7 is mounted in the larger-diameter portion 2. A cap (not shown) is detachably attachable to the retainer 7. A cylindrical cover 8 made of a synthetic resin is tightly fitted with outer peripheries of the retainer 7 and larger-diameter portion 2. The filler pipe body 1 is made by forming a clad tube into a predetermined shape. The clad tube has a double layer structure including a core 1$a$ made of an aluminum alloy and a outer cladding layer made of an aluminum alloy with an effect of sacrificial anode for the core 1$a$ as shown in FIG. 5.

The aluminum clad tube used for the filler pipe body 1 has an outer diameter ranging from 25.4 mm to 35 mm and an entire thickness ranging from 1.0 mm to 1.2 mm. The outer cladding layer 1$b$ has a thickness of about 100 μm. The core 1$a$ of the aluminum clad tube consists of, by mass, 0.6% to 1.5% Mn, 0.05% to 0.5% Cu, 0%<Si≦0.6%, 0%<Fe≦0.7%, and a remainder of aluminum and unavoidable impurity. The outer cladding layer 1$b$ consists of, by mass, 0.6% to 1.5% Zn, Si+Fe≦0.7%, and a remainder of aluminum and unavoidable impurity.

It is preferable that the outer cladding layer 1$b$ has a cladding ratio ranging from 5% to 15%. It is more preferable that the cladding ratio ranges from 6% to 12%. When the clad ratio is below 5%, the corrosion resistance becomes insufficient. When the clad ratio exceeds 15%, it is difficult to mass produce.

The following describes the reason for the aforementioned limitation of the chemical composition of the aluminum clad tube.

1. Composition of the Core:

Mn serves to improve the strength and corrosion resistance of the core. The content of Mn ranges from 0.6% to 1.5% by mass as described above. When the content of Mn is below 0.6%, the strength of Mn becomes insufficient. When the content of Mn exceeds 1.5%, the workability is reduced. It is more preferable that the content of Mn ranges from 1.0% to 1.2%.

Cu also serves to improve the strength and corrosion resistance of the core. The content of Cu ranges from 0.05% to 0.5% by mass as described above. When the content of Cu is below 0.05%, the strength of Cu becomes insufficient. When the content of Cu exceeds 0.5%, the workability is reduced. It is more preferable that the content of Cu ranges from 0.05% to 0.2%.

Si is contained as impurity in the aluminum alloy. The content of Si is $0\% < Si \leq 0.6\%$. When the content of Si exceeds 0.6%, the workability is reduced. It is more preferable that the content of Si is not more than 0.2%.

Fe is contained as impurity in the aluminum alloy. Since Fe reduces the corrosion resistance, it is preferable that the content of Fe is not more than 0.7%. It is more preferable that the content of Fe ranges from 0.2% to 0.6%.

2. Composition of Outer Cladding Layer:

Zn exhibits the effect of sacrificial anode for the core, thereby preventing occurrence of pitting corrosion in the core. The content of Zn ranges from 0.6% to 1.5%. When the content of Zn is below 0.6%, the corrosion resistance is reduced by the insufficient potential difference between the core and Zn. When the content of Zn exceeds 1.5%, the self-corroding speed of the outer cladding layer is increased such that the corrosion resistance is reduced. It is more preferable that the content of Zn ranges from 0.2% to 1.2%.

Each of Si and Fe is contained as impurity in the aluminum alloy but reduces the corrosion resistance. Accordingly, it is preferable that a total content of Si and Fe is not more than 0.7%. It is more preferable that a total content of Si and Fe ranges from 0.2% to 0.5%.

A circulation tube 5 has an end 5a which is connected to the larger-diameter portion 2 of the filler pipe 1 so as to communicate with the larger-diameter portion. The circulation tube 5 has the other end 5b extending near an exit 3 of the filler pipe 1. The circulation tube 5 is also made into a predetermined shape using a clad tube having a double layer structure including a core and a outer cladding layer each of which is made of an aluminum alloy. The cladding tube used for the circulation tube 5 has an outer diameter from 6.35 mm to 14 mm and an entire thickness ranging from 0.8 mm to 1.2 mm. The outer cladding layer has a thickness of about 100 μm.

An air vent tube 6 has one end 6a inserted into a gas vent 8a formed integrally on the outer periphery of the cover 8. The air vent tube 6 has the other end 6b adapted to be connected to the known canister side. The end 6b extends substantially to the middle of the filler pipe body 1. The air vent tube 6 is also made into a predetermined shape using the clad tube having a double layer structure including a core and a outer cladding layer each of which is made of an aluminum alloy as the filler pipe body 1. The aluminum clad tube used for the air vent tube 6 has an outer diameter ranging from 12 to 20 mm and an entire thickness ranging from 0.8 mm to 1.2 mm. The outer cladding layer has a thickness of about 100 μm.

Figure 3:
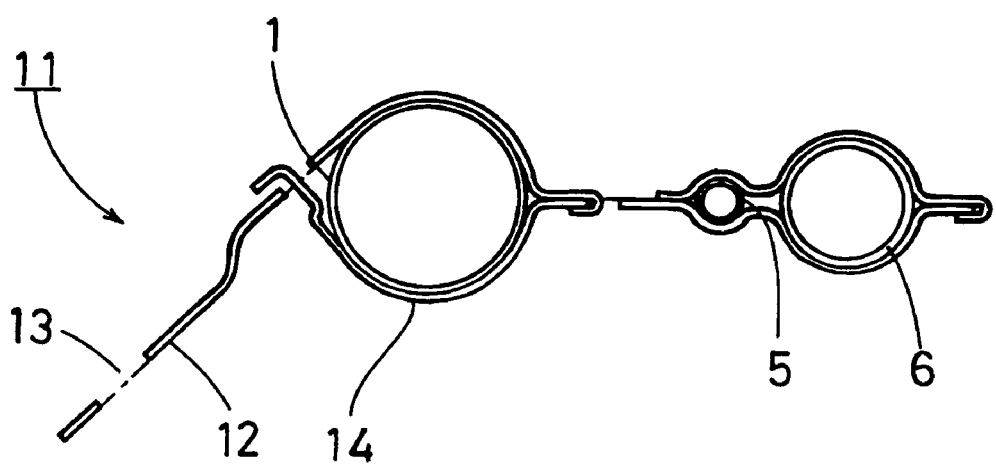
FIG. 3 is a sectional view taken along line A—A in FIG. 1.
Figure 4:
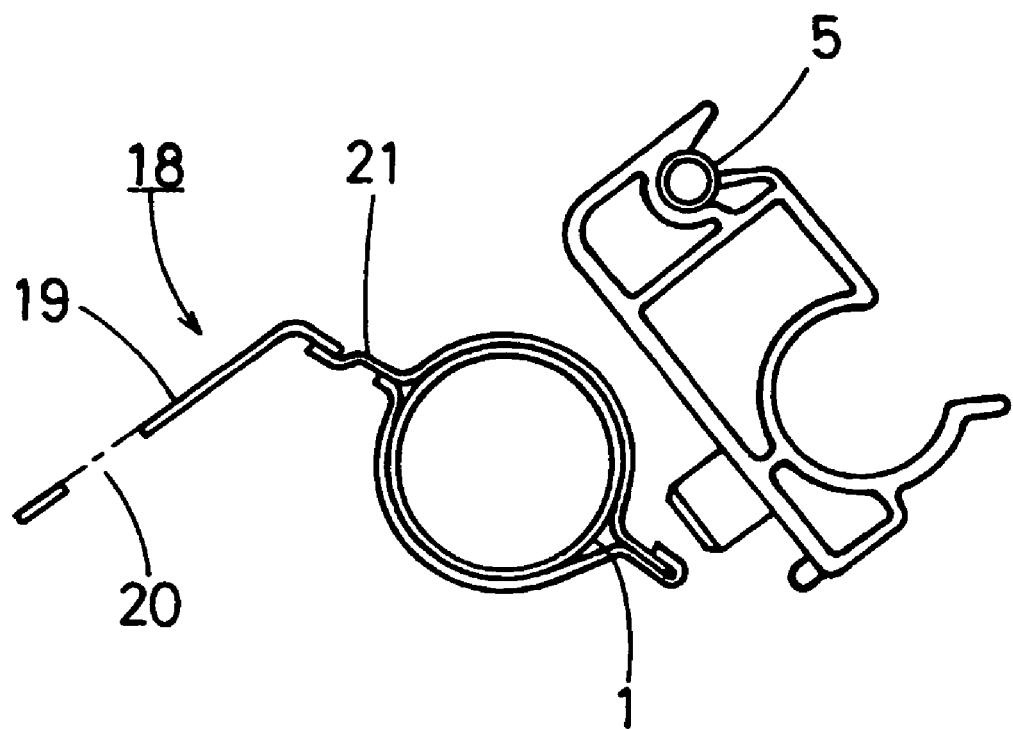
FIG. 4 is a sectional view taken along line B—B in FIG. 2.

The aforementioned circulation tube 5 and the air vent tube 6 are fixed to the filler pipe body 1 by mounting supports 11 and 16 both made of aluminum so that the filler pipe f is mounted on an automobile body. The filler pipe body 1, circulation tube 5 and air vent tube 6 are held between a body 12 formed with a mounting hole 13 and holding part 14 of the mounting support 11 thereby to be fixed, as shown in FIG. 3. Another mounting support 18 is made of aluminum and fixed near the exit 3 of the filler pipe body 1. The filler pipe body 1 is held between a body 19 formed with a mounting hole 20 and a holding part 21 thereby to be fixed, as shown in FIG. 4. The filler pipe f of the second embodiment is thus constructed.

Figure 6:
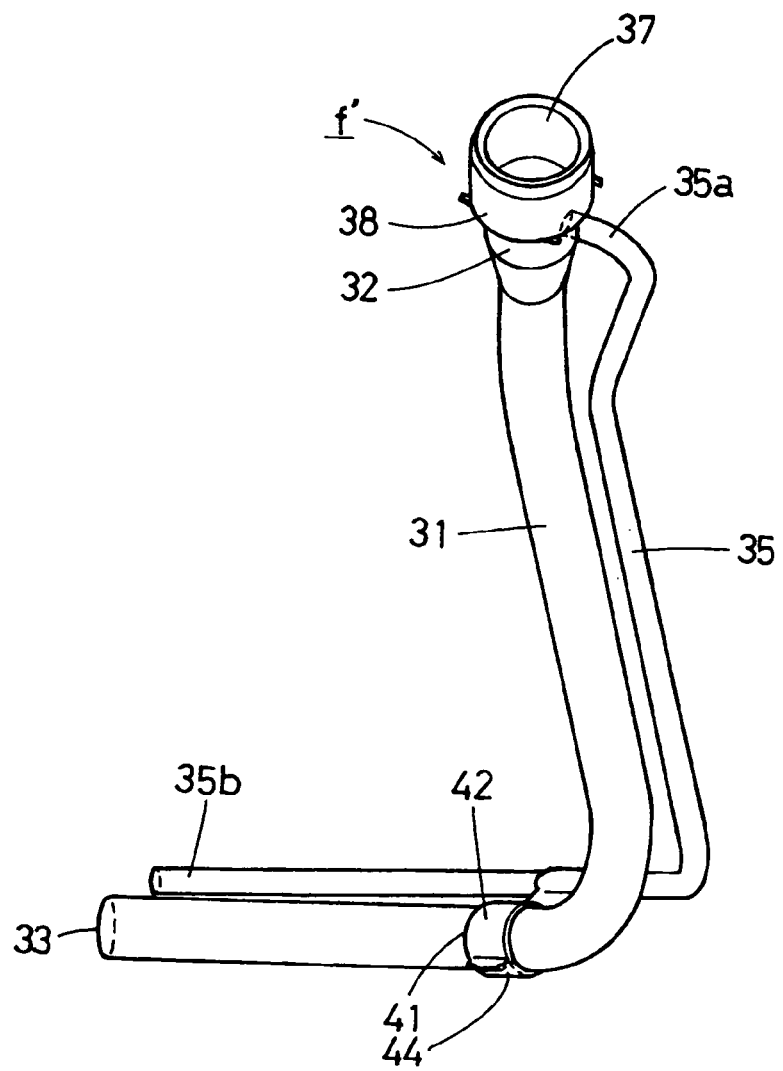
FIG. 6 is a side view of the fuel filler pipe of a second embodiment in accordance with the present invention.
Figure 7:
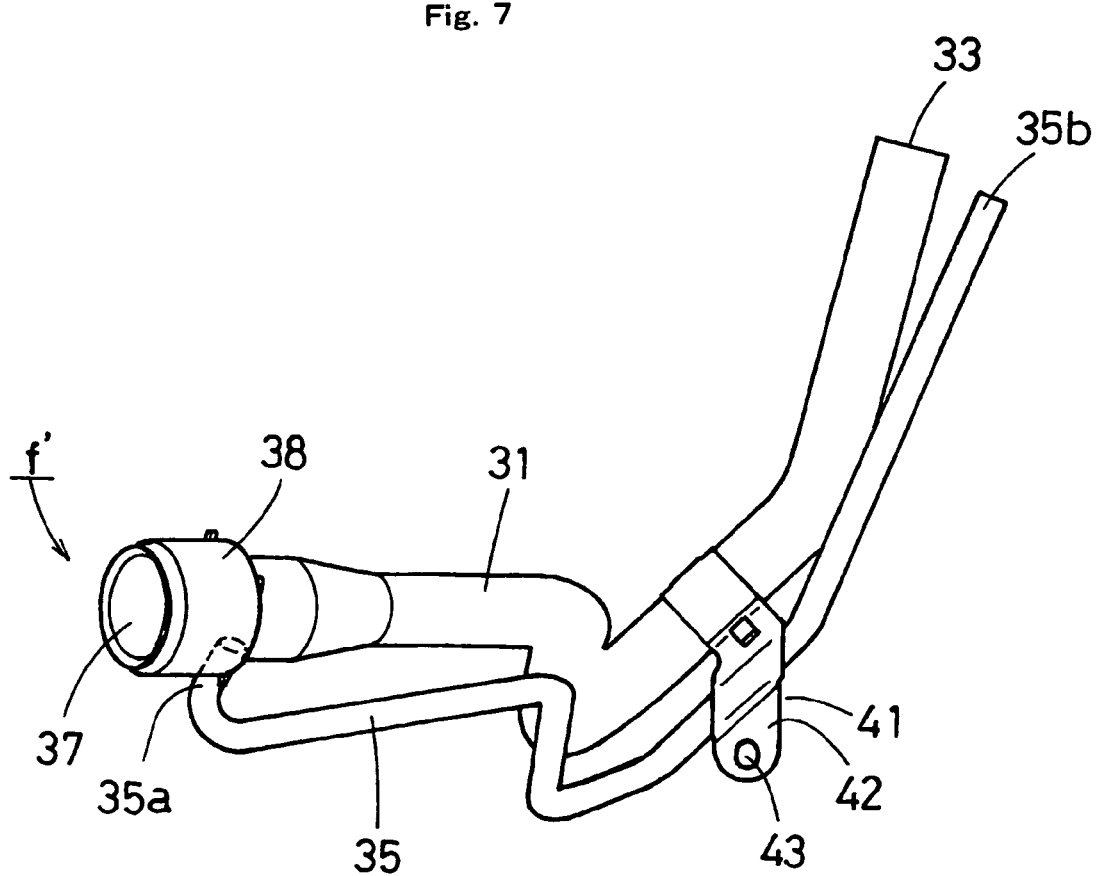
FIG. 7 is a plan view of the fuel filler pipe of the second embodiment.

FIGS. 6 and 7 illustrate a second embodiment of the invention. The filler pipe f' of the second embodiment comprises the filler pipe body 31 and a breather tube 35. The filler pipe f' of the second embodiment differs from the filler pipe f in that the air vent tube is not formed integrally with the filler pipe body 31. The air vent tube is interposed between the fuel tank and the canister in the fuel supply system using the filler pipe f'.

Referring to FIG. 6, the filler pipe f' includes a filler pipe body 31 formed into a cylindrical shape and has a substantially uniform diameter except for a larger-diameter portion 32 of an upper end thereof located at the fuel supply port side. A retainer 37 is mounted in the larger-diameter portion 32. A cap (not shown) is detachably attachable to the retainer 7. A cylindrical cover 38 made of a synthetic resin is tightly fitted with outer peripheries of the retainer 37 and larger-diameter portion 32. The filler pipe body 31 is made by forming a clad tube into a predetermined shape.

A breather tube 35 has an end 35a which is connected to the larger-diameter portion 32 of the filler pipe 31 so as to communicate with the larger-diameter portion. The breather tube 5 has the other end 35b extending nearly to an exit 33 of the filler pipe 1. The breather tube 35 is also made into a predetermined shape. The clad tube used for the breather tube 35 is made of the same material as the circulation tube 5.

The breather tube 35 is fixed to the filler pipe body 31 by the aluminum mounting support 41 used for mounting the filler pipe f' to the vehicle body. The mounting support 41 includes a holder 42 formed with a mounting hole 43 and a mating holder 44 as shown in FIG. 4. The filler pipe 31 and the breather tube 35 are held by the holder 42 and the mating holder 44 to be fixed. The filler pipe f' of the second embodiment is thus constructed.

Examples of the aluminum clad tube used in the fuel filler pipe of the invention will be described in comparison with compared cases. TABLE 1 shows compositions of alloy materials A to E for the core. TABLE 2 shows alloy compositions of outer cladding layers a to e. TABLE 3 shows clad tubes made by a normal method using a billet with a double layer structure including a outer cladding layer alloy provided on the periphery of the core alloy. Each clad tube has an outer diameter of 25 mm and the entire thickness of 1 mm.

TABLE 1

| | Alloy composition in mass % | | | | |
|---|---|---|---|---|---|
| Core | Si | Fe | Cu | Mn | Al |
| A | 0.2 | 0.4 | 0.1 | 1.2 | remainder |
| B | 0.5 | 0.4 | 0.1 | 1.2 | remainder |
| C | 0.2 | 0.65 | 0.3 | 1.2 | remainder |

TABLE 1-continued

| | Alloy composition in mass % | | | | |
|---|---|---|---|---|---|
| Core | Si | Fe | Cu | Mn | Al |
| D | 0.2 | 0.3 | 0.45 | 1.1 | remainder |
| E | 0.2 | 0.3 | 0.1 | 1.4 | remainder |

TABLE 2

| | Alloy composition in mass % | | | |
|---|---|---|---|---|
| Cladding | Si | Fe | Zn |
| a | 0.1 | 0.1 | 1 |
| b | 0.2 | 0.4 | 1 |
| c | 0.4 | 0.2 | 1 |
| d | 0.1 | 0.1 | 1.45 |
| e | 0.1 | 0.1 | 0.65 |

TABLE 3

| Test piece | Core | Cladding | Thickness (mm) | Cladding ratio (%) | Corrosion resistance | Workability |
|---|---|---|---|---|---|---|
| 1 | A | a | 1 | 10 | ○ | ○ |
| 2 | B | a | 1 | 10 | ○ | ○ |
| 3 | C | a | 1 | 10 | ○ | ○ |
| 4 | D | a | 1 | 10 | ○ | ○ |
| 5 | E | a | 1 | 10 | ○ | ○ |
| 6 | A | a | 1 | 10 | ○ | ○ |
| 7 | A | b | 1 | 10 | ○ | ○ |
| 8 | A | c | 1 | 10 | ○ | ○ |
| 9 | A | d | 1 | 10 | ○ | ○ |
| 10 | A | e | 1 | 10 | ○ | ○ |
| 11 | A | a | 1 | 10 | ○ | ○ |
| 12 | A | a | 1 | 10 | ○ | ○ |
| 13 | A | a | 1 | 5 | ○ | ○ |
| 14 | A | a | 1 | 15 | ○ | ○ | where symbol "○" in corrosion resistance means no occurrence of penetrating corrosion and symbol "○" in workability means no occurrence of crack.

Test pieces were made into the shape of the filler pipe body of the foregoing filler pipe f using the above-described clad tubes (Nos. 1 to 14 in TABLE 3). A corrosion test (corrosion resistance) and workability experiment were conducted with respect to the test pieces.

1. Corrosion Test

Regarding the aforementioned test pieces, a cycle test (180 cycles) was conducted on the basis of JASO M 610-92 (automobile component appearance corrosion test method) in order that occurrence of penetrating corrosion might be examined.

2. Workability

The aforementioned test pieces were also examined with respect to occurrence of crack due to the forming of the larger-diameter portion.

TABLE 3 shows the results of the tests. Each of the test pieces 1 to 14 had no penetrating corrosion and accordingly was superior in the corrosion resistance. Additionally, each of the test pieces 1 to 14 had no crack due to the forming of the larger-diameter portion and accordingly good workability.

COMPARED EXAMPLES

Clad tubes as shown in TABLE 6 were made by the same method as in the foregoing embodiments using billets of core alloys as designated by symbol "A" in TABLE 1 and shown in TABLE 4 and further billets of outer cladding layer alloys as designated by symbol "a" in TABLE 2 and shown in TABLE 5. Each of the clad tubes had an outer diameter of 25 mm and an entire thickness of 1 mm. Test pieces (Nos. 15 to 23 in TABLE 6) which were the same as those in the foregoing embodiments were made using the clad tubes. Occurrence of corrosion and workability were examined concerning the test pieces in the same manner as in the foregoing embodiments.

TABLE 4

| | Alloy composition (mass %) | | | | |
|---|---|---|---|---|---|
| Core | Si | Fe | Cu | Mn | Al |
| F | 0.7 | 0.4 | 0.1 | 1.2 | remainder |
| G | 0.2 | 0.8 | 0.1 | 1.2 | remainder |
| H | 0.2 | 0.4 | 0.6 | 1.2 | remainder |
| I | 0.2 | 0.4 | 0.1 | 1.6 | remainder |

TABLE 5

| | Alloy composition in mass % | | | |
|---|---|---|---|---|
| Cladding | Si | Fe | Zn |
| f | 0.5 | 0.5 | 1 |
| g | 0.1 | 0.1 | 1.7 |
| h | 0.1 | 0.1 | 0.3 |

TABLE 6

| Test piece | Core | Cladding | Thickness (mm) | Cladding ratio (%) | Corrosion resistance | Workability |
|---|---|---|---|---|---|---|
| 15 | F | a | 1 | 10 | — | X |
| 16 | G | a | 1 | 10 | — | X |
| 17 | H | a | 1 | 10 | — | X |
| 18 | I | a | 1 | 10 | — | X |
| 19 | A | f | 1 | 10 | X | ○ |
| 20 | A | g | 1 | 10 | X | ○ |
| 21 | A | h | 1 | 10 | X | ○ |
| 22 | A | a | 1 | 3 | X | ○ |
| 23 | A | a | 1 | 20 | — | — (Low in pipe productivity) | where in the column of corrosion resistance, symbol "X" means that penetrating corrosion occurred and symbol "—" means that no evaluation was made.
In the column of workability, symbol "○" means no occurrence of crack, symbol "X" means that the test piece had crack, and symbol "—" means that no evaluation was made.

As the results of the experiment, none of test piece Nos. from 15 to 23 satisfied corrosion resistance nor workability as shown in TABLE 6. Consequently, these test pieces were found to be unsuitable for the aluminum clad tube used in the automobile fuel filler pipe.

As described above, the fuel filler pipe of the embodiment employs the aluminum clad tube. Consequently, the fuel filler pipe of the embodiment can achieve a weight reduction by about 50% as compared with the conventional fuel filler pipes made of steel or stainless steel and can reduce the production cost as compared with the conventional fuel filler pipe made of stainless steel. Additionally, a good corrosion resistance can be achieved by the clad layer of the clad tube.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A fuel filler pipe for an automobile, which is provided between a fuel tank and canister, and fuel supply port, the fuel filler pipe comprising:
   a fuel filler pipe body having an upper end; and
   a circulation tube and an air vent tube each of which has an end communicating with the upper end of the fuel filler pipe body, wherein each of the filler pipe body, circulation tube and air vent tube comprises a clad tube made of an aluminum and having a double-layer structure including a core made of an aluminum alloy and a outer cladding layer made of an aluminum alloy and having an effect of sacrificial anode for the core.

2. A fuel filler pipe for an automobile, which is provided between a fuel tank and canister, and fuel supply port, the fuel filler pipe comprising:
   a fuel filler pipe body having an upper end; and
   a breather tube having an end communicating with the upper end of the fuel filler pipe body, wherein each of the filler pipe body and the breather tube comprises a clad tube made of an aluminum and having a double-layer structure including a core made of an aluminum alloy and a outer cladding layer made of an aluminum alloy and having an action of sacrificial anode for the core.

3. The fuel filler pipe of claim 1 or 2, wherein the core of the aluminum clad tube consists of, by mass, 0.6% to 1.5% Mn, 0.05% to 0.5% Cu, $0\% < Si \leq 0.6\%$, $0\% < Fe \leq 0.7\%$, and a remainder of aluminum and unavoidable impurity, the outer cladding layer consists of, by mass, 0.6% to 1.5% Zn, $Si+Fe \leq 0.7\%$, and a remainder of aluminum and unavoidable impurity, and the outer cladding layer has a cladding ratio ranging from 5% to 15%.

4. The fuel filler pipe of claim 1 or 2, wherein a mounting support made of aluminum is adapted to be fixed to the filler pipe body.

5. The fuel filler pipe of claim 3, wherein a mounting support made of aluminum is adapted to be fixed to the filler pipe body.

* * * * *